United States Patent [19]

Mayo

[11] 4,316,400
[45] Feb. 23, 1982

[54] WOOD MEMBER CUTTING APPARATUS

[75] Inventor: George L. Mayo, Fort Worth, Tex.

[73] Assignees: Stoddard H. Pyle; Wayne R. Roberts, both of Corvallis, Oreg.

[21] Appl. No.: 231,663

[22] Filed: Feb. 5, 1981

Related U.S. Application Data

[62] Division of Ser. No. 112,530, Jan. 16, 1980, Pat. No. 4,277,998.

[51] Int. Cl.$^3$ .............................................. B27B 5/04
[52] U.S. Cl. .................................... 83/425.2; 83/433; 83/508.2
[58] Field of Search ................. 83/404.1, 425.2, 425.4, 83/433, 508.3, 508.2, 498, 499, 504

[56] References Cited

U.S. PATENT DOCUMENTS

| | | | |
|---|---|---|---|
| 2,827,933 | 3/1958 | Rawson | 83/508.3 |
| 2,961,015 | 11/1960 | Randall | 83/508.3 |
| 3,080,895 | 3/1963 | Mayo | 83/404.1 |
| 3,229,732 | 1/1966 | Mayo | 83/404.1 |
| 3,380,494 | 4/1968 | Mayo | 83/404.1 |

Primary Examiner—James M. Meister

Attorney, Agent, or Firm—D. Paul Weaver

[57] ABSTRACT

A base frame mounts a first gang of saws in a common vertical datum plane and a first wood member conveyor device. A second gang of saws in a common vertical datum plane and a second wood member conveyor device are mounted on a carriage on the base frame for movement toward and away from the first gang of saws and first conveyor device. Each saw in each gang is independently vertically adjustable in its vertical datum plane and each saw is rotatable a full 180 degrees around the axis of a chord on the saw blade lying in the common datum plane of such saw. Each saw, during its angular rotation, is precisely supported on a double pantograph movement linkage which follows an arcuate track centered on said chord and vertical datum plane. A precision drive for the wood member conveyor devices and carriage obviates the necessity for a long torque shaft and enables much greater versatility of operation of the apparatus. A precision automatic wood member measuring device and carriage positioner is provided on the front of the base frame. The range of utility of the apparatus is significantly increased.

3 Claims, 22 Drawing Figures

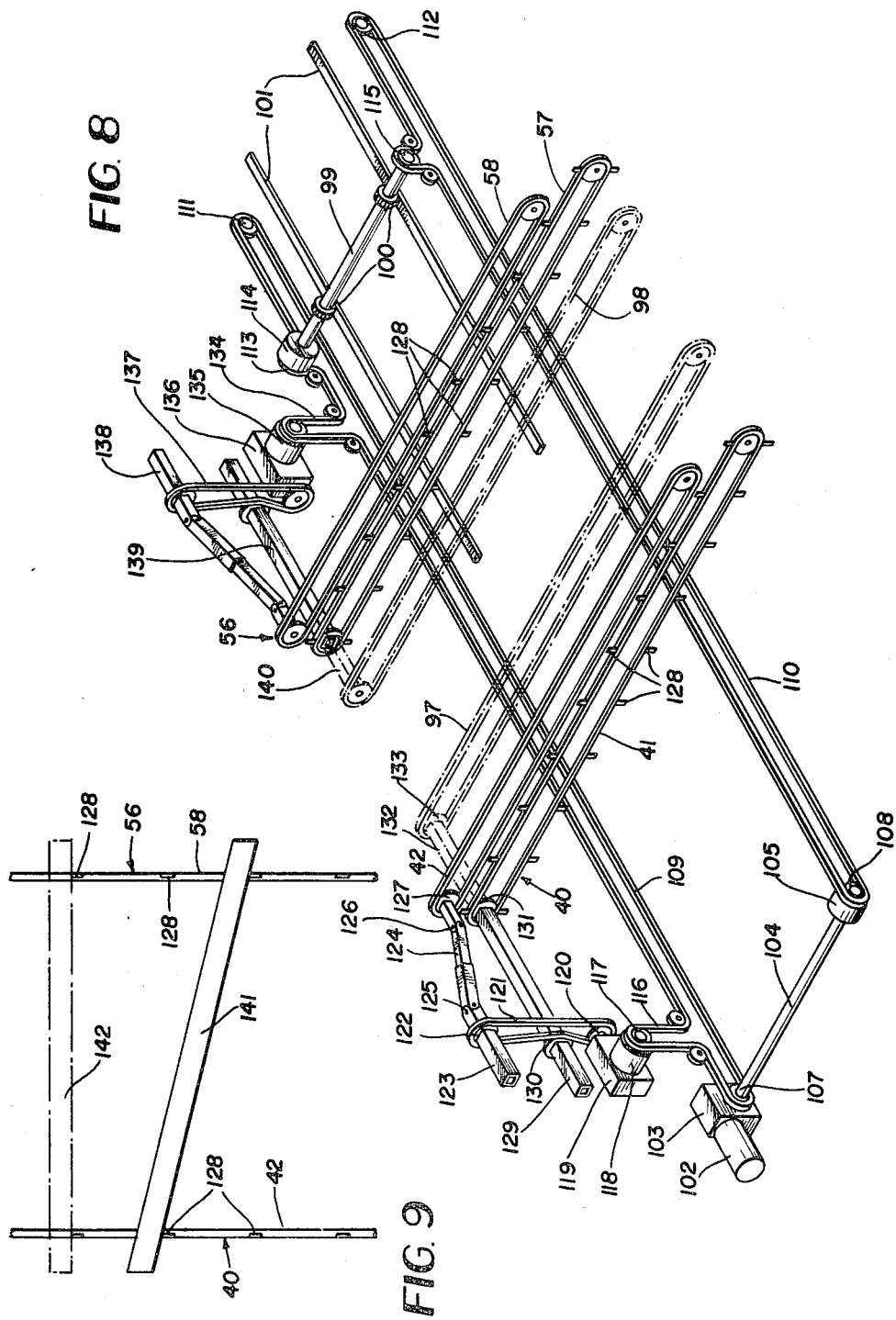

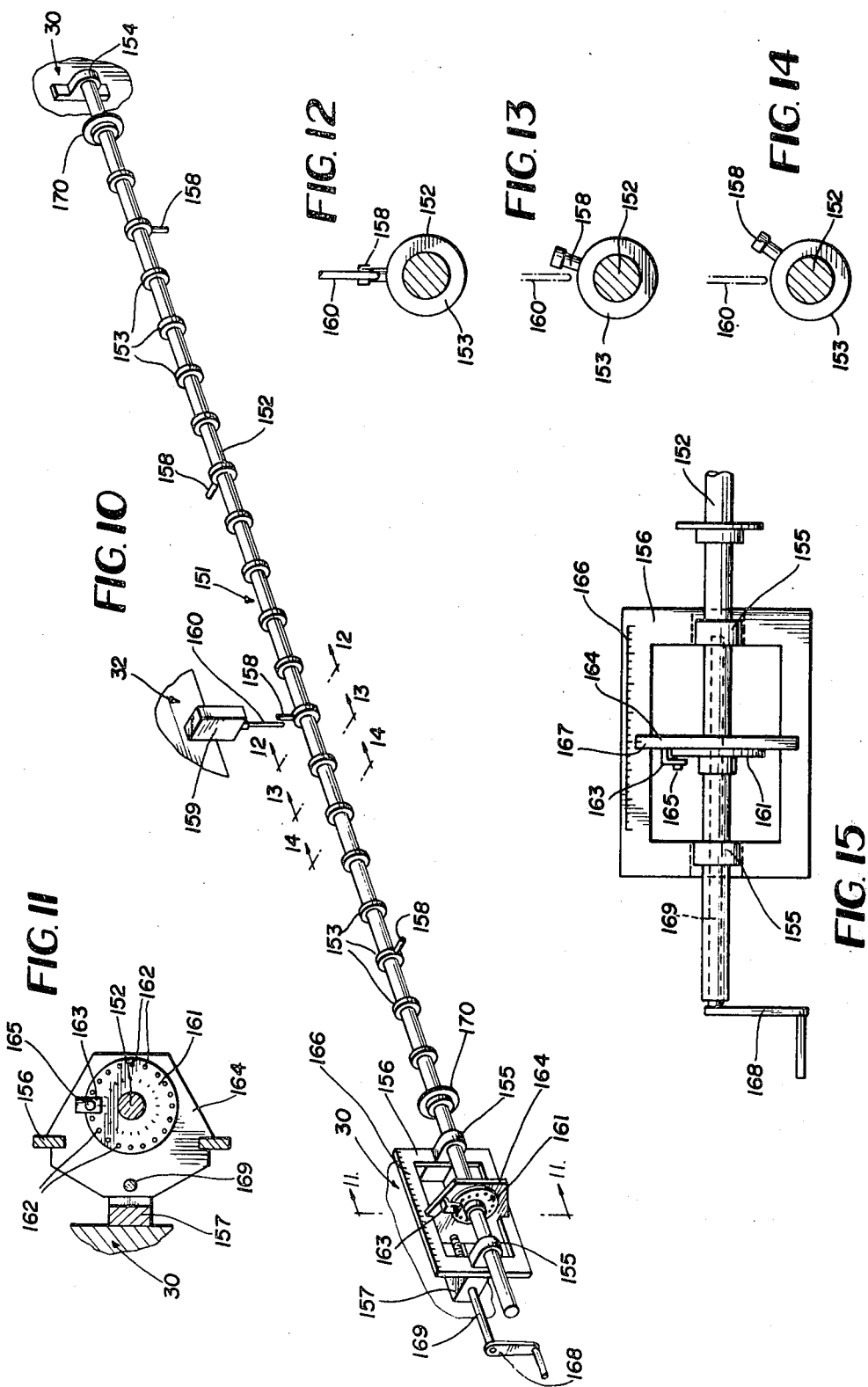

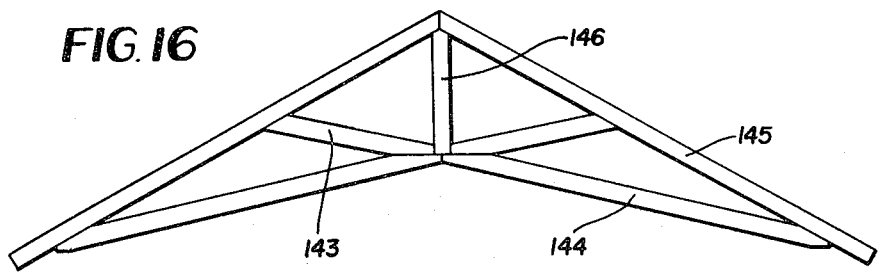
FIG. 16
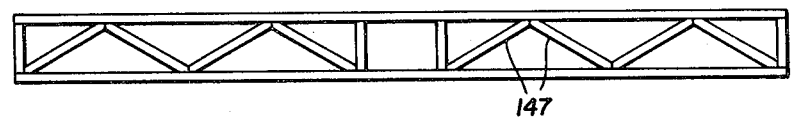
FIG. 17
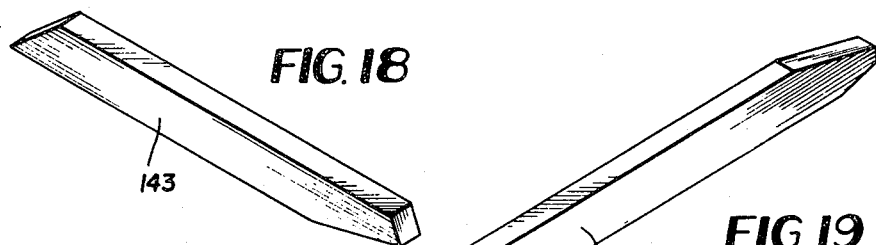
FIG. 18
FIG. 19
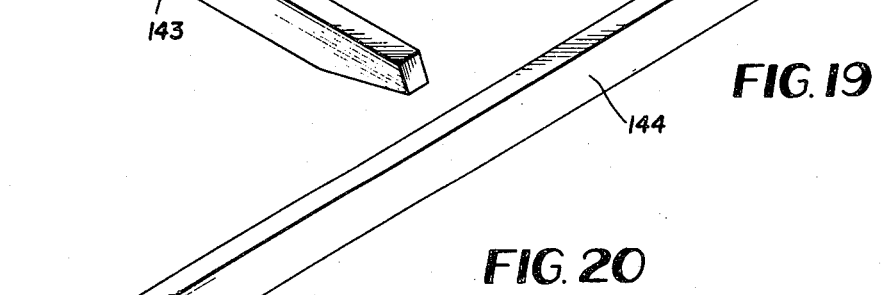
FIG. 20
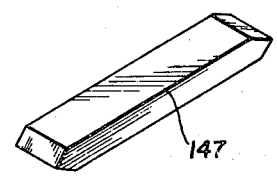
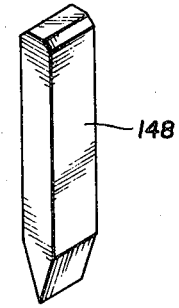
FIG. 21
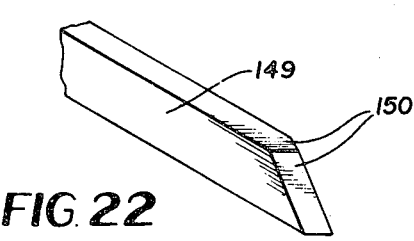
FIG. 22

WOOD MEMBER CUTTING APPARATUS

PRIOR RELATED APPLICATION

This application is a division of prior filed U.S. patent application Ser. No. 112,530, filed on Jan. 16, 1980, now U.S. Pat. No. 4,277,998.

BACKGROUND OF THE INVENTION

The present invention in an improvement on that type of wood member cutting apparatus shown in prior U.S. Pat. Nos. 3,080,895; 3,229,732 and 3,380,494, issued to George L. Mayo.

In common with these prior art apparatuses, the present invention is used for cutting wood members used in the manufacturing of wooden roof and floor trusses and for many other purposes where precision repetitive cutting of members on a production basis is required. As in the prior patented apparatuses, the present invention includes a stationary base frame, a first gang of power saws and first conveyor means mounted near one end of the base frame, a carriage on the base frame movable toward and away from the first gang of saws and first conveyor means, and a second gang of saws and second coacting conveyor means mounted on the carriage. The present invention, like the prior patented apparatuses includes a driving system for the conveyor means and the carriage and a means to gage the lengths of wood members being cut in the apparatus.

The prior patented apparatuses, while quite efficient in the overall, possess certain definite drawbacks which are fully eliminated in the present invention. The most serious of these drawbacks is the comparatively limited mobility of the cutoff saws in the two gangs and the complete lack of any independent vertical adjustment of the saws in the gangs. As a result, the saws of the prior patented apparatuses are limited to 90 degrees of rotation or pivoting to avoid interference with the workpieces being cut, and are also restricted to cutting with only one segment of the circular blade of each saw.

These restrictions are eliminated in the present invention by the provision of an independent vertical adjustment for each saw in the two gangs of saws within a vertical datum or reference plane common to each saw gang. This critical adjustment together with an expanded double pantograph precision support and guidance mechanism for each saw greatly increases the rotational mobility of each saw to such an extent that each saw independently can rotate a full 180 degrees around the axis of a chord across the saw blade lying in the vertical datum plane for such blade.

This improved arrangement enables two segments on diametrically opposite parts of each saw blade to be utilized for cutting wood members, instead of one segment only, thus increasing the number of angle cuts which can be made during each pass of a wood member through the apparatus and also increasing the variety of types of cuts which can be made. The improved arrangement enables the addition of another saw in each of the two gangs, compared to the arrangements in the prior patented apparatuses, where individual saw rotation is limited to 90 degrees.

Another drawback of the prior art which this invention completely overcomes is the use of a very long torque shaft for driving the comveyor system. Such a long shaft is difficult to support and is likely to be damaged resulting in poor operation of the conveyor system and expensive repairs. To overcome this difficulty, an improved conveyor drive in this invention eliminates entirely the use of a long torque shaft in the conveyor system. Instead, the drive employs an arrangement of electromagnetic clutch devices associated with chain and sprocket gearing powered directly by a single drive unit to operate both the stationary and carriage mounted conveyor components in unison or independently as particular requirements dictate to greatly increase the precision and versatility of the conveyor system. The improved arrangement enables the use of separable auxiliary work conveyors directly driven by the drive means of the primary conveyors when long wood members are involved.

Another important improvement feature over the prior art is the provision in the present invention of a precision wood member measuring device on the front of the base frame of the apparatus which can automatically stop the carriage and thus position the two saw gangs for cutting wood members of any required length with high precision.

The improved more versatile conveyor system also enables certain compound angle cuts to be made on wooden members which are not possible in the prior art.

Other features and advantages of the present invention will be made apparent to those skilled in the art during the course of the following detailed description.

BRIEF DESCRIPTION OF THE DRAWINGS

FIG. 8 is a partly schematic perspective view of an integrated precision drive system for primary and auxiliary conveyors and for the carriage which supports one-half of the conveyor system and one saw gang.

FIG. 9 is a partly schematic plan view of the primary conveyors showing their operation for enabling compound angle cutting of wood members.

FIG. 10 is a perspective view of an automatic wood member measuring device.

FIG. 11 is an enlarged transverse vertical section taken on line 11—11 of FIG. 10.

FIGS. 12, 13 and 14 are similar views taken on lines 12—12, 13—13 and 14—14 of FIG. 10.

FIG. 15 is a fragmentary front elevation of the measuring device fine adjusting means.

FIG. 16 is a plan view of a truss constructed from wooden members of the type which the present invention can produce with precision on a production basis.

FIG. 17 is a plan view of another form of truss made from members which the invention can produce with precision.

FIGS. 18, 19 and 20 are perspective views of individual members utilized in the trusses shown in FIGS. 16 and 17.

FIG. 21 is a perspective view of a surveyor's stake which the apparatus can produce.

FIG. 22 is a fragmentary perspective view of a wooden member having a compound angle cut which the invention can produce.

DETAILED DESCRIPTION

Figure 1:
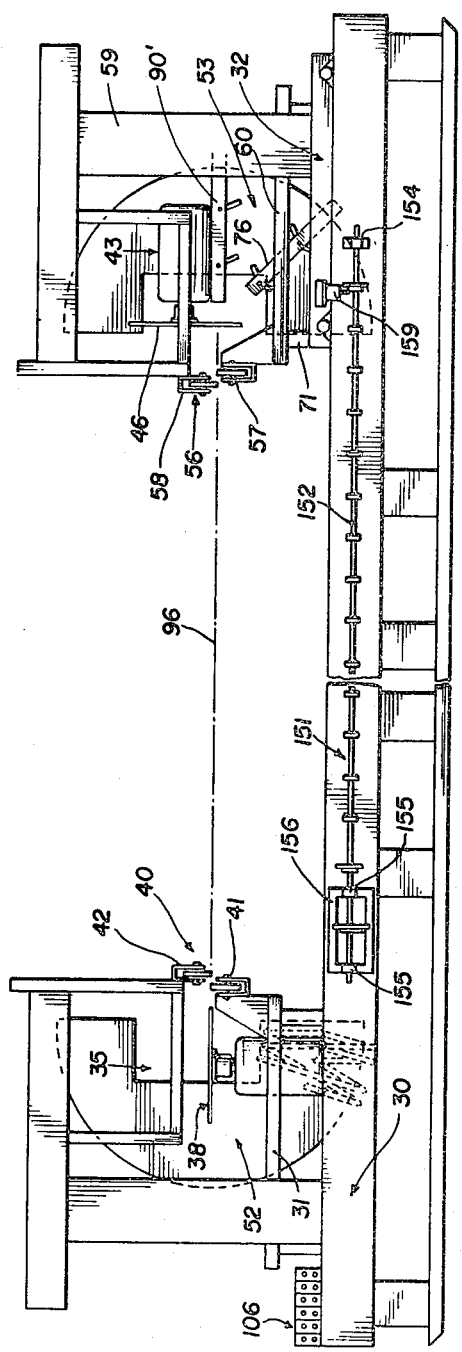
FIG. 1 is a side elevation of an apparatus for cutting wood members according to the invention, with parts omitted for clarity.
Figure 2:
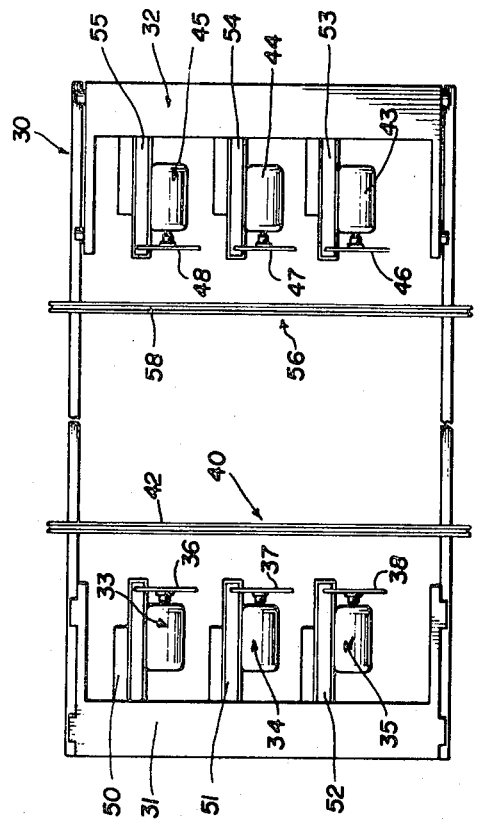
FIG. 2 is a fragmentary plan view of the apparatus in FIG. 1, with parts omitted.
Figure 6:
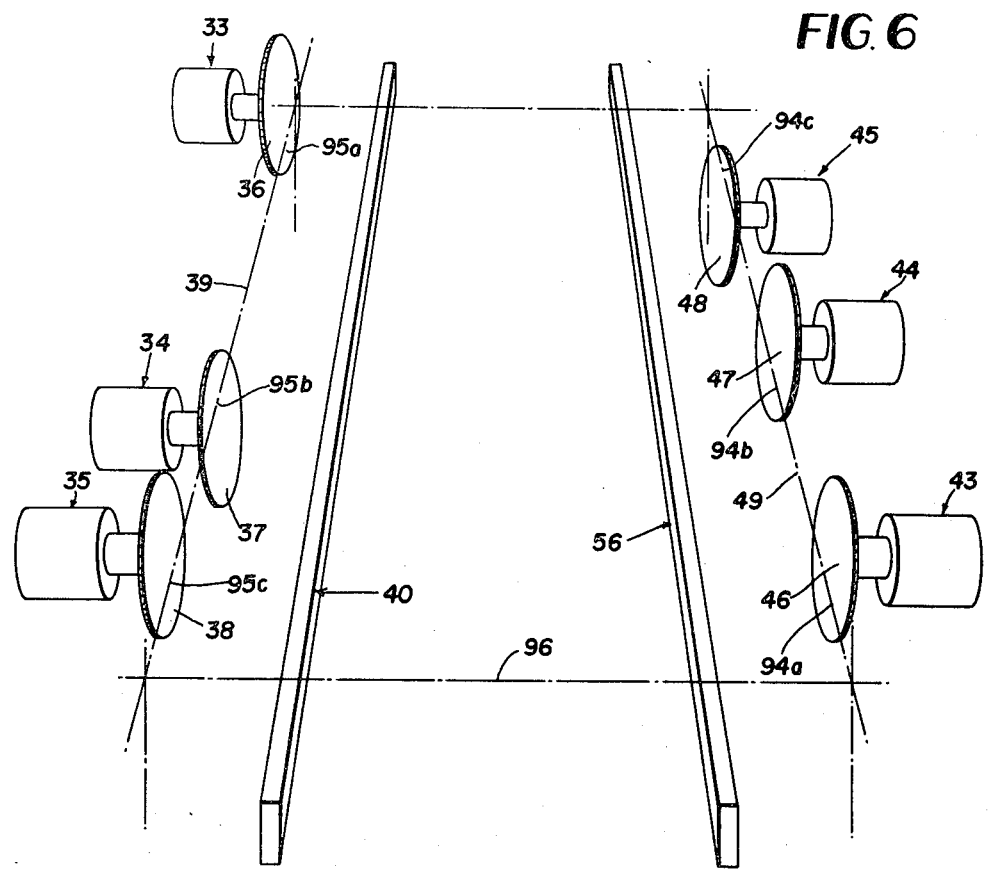
FIG. 6 is a schematic perspective view of two saw gangs and their associated wooden member conveyors in relation to vertical and horizontal datum planes.

For reference throughout the description, the front of the apparatus is that which is viewed in FIG. 1 and its rear is that which is at the top of FIG. 2 and the far side of FIGS. 6 and 8. The right and left hand ends of the apparatus are the right and left hand ends in FIGS. 1, 8 and 10.

Since the referenced prior Mayo patents fully disclose basic components of the invention, such components as are common to the prior patents will be briefly described, while new and improved components will be fully described.

Referring to the drawings in detail wherein like numerals designate like parts, the apparatus comprises an elongated stationary base frame 30 having a transverse stationary platform means 31 at one end thereof and a carriage 32 movably mounted thereon near its opposite end, the carriage being movable toward and from the platform means 31 under influence of mechanism to be described.

Figure 7:
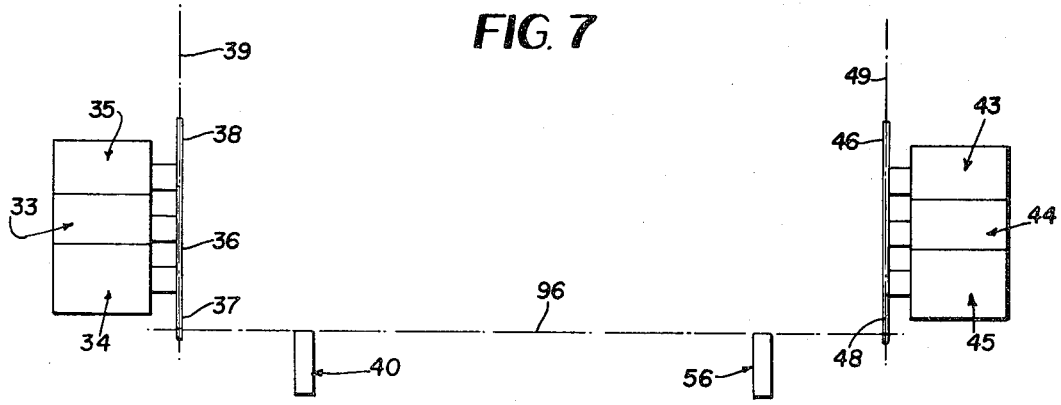
FIG. 7 is a front elevation of the elements shown in FIG. 6.

Attached to the stationary platform means 31 is a first gang of saws, namely three saws 33, 34 and 35, having their circular blades 36, 37 and 38 lying in a common vertical datum or reference plane 39, FIGS. 6 and 7. Also attached to the platform means 31 is a relatively stationary primary conveyor 40 including a lower section 41 and an upper section 42 between which conveyed wood members are fed rearwardly from the front to the rear of the apparatus. The axis of primary conveyor 40 is perpendicular to the longitudinal axis of base frame 30 and perpendicular to the path of movement of carriage 32 on the base frame 30.

Attached to carriage 32 and moving therewith at proper times along the base frame 30 toward and from stationary platform 31 is a second gang of saws 43, 44 and 45 having their circular blades 46, 47 and 48 lying in a common vertical datum plane 49 parallel to the datum plane 39, FIGS. 6 and 7.

The saws 33, 34 and 35 of the first gang are mounted on supports 50, 51 and 52 fixed on the platform 31 and the saws 43, 44 and 45 of the second gang have similar supports 53, 54 and 55 fixed to the carriage 32 and movable therewith. Also fixed to the carriage 32 and moving therewith is a primary conveyor 56 consisting of a lower conveyor section 57 and an upper section 58 parallel to the conveyor sections 41 and 42.

As each saw support on the brace frame 30 and carriage 32 is identical, a complete description of one support will suffice to describe them all. Therefore, in FIGS. 3 through 6, the support 53 for carriage mounted saw 43 is shown and comprises a frame 59 having its base 60 attached to the carriage 32, not shown, and also having a head member 61. Between the base 60 and head member 61 and rigid therewith are parallel vertical guide bars 62. A semi-circular vertical support plate 63 having gear or sprocket teeth 64 formed all along its semi-circular edge has three spaced vertical axis guide bearings 65 fixed to its rear face and being in precision guided engagement with the guide bars 62. The plate 63 and the saw 43 and associated saw movement means to be described, all attached to the plate 63, are raised and lowered vertically by a vertical axis screw shaft 66 having a crank handle 67 at the top of the support 53, the screw shaft having threaded engagement with a drive nut 68 fixed on the plate 63. A linear measurement scale 69 extending vertically and fixed to the frame 29 coacts with a pointer 70 on the adjacent guide bearing 65 to indicate the vertically adjusted position of each independently adjustable saw of the system. This independent vertical adjustment feature for each of the six saws is an important improvement over the prior art contributing to greatly increased utility of the apparatus.

On the support 53 and every other like support of the apparatus is a supporting and constrained rotational movement means for the particular saw, such as the saw 43. This means is in the nature of a modified pantograph linkage and comprises a vertical base link 71, FIG. 3, fixed to the lower portion of plate 63 along the vertical edge thereof. A double parallelogram linkage consisting of links 72, 73, 74 and 75 interconnects the fixed link 71 with an intermediate floating base link 76 having a powered or idler gear 77 engaging the teeth 64 of semi-circular plate 63. Pivots 78 and 79 for the two links 72 and 73 are on the stationary base link 71 and corresponding pivots 80 and 81 for the two links 74 and 75 are on the floating base link 76, the two longer links 73 and 74 of the lower double parallelogram linkage between base links 71 and 76 being shown at 82.

Above the floating base link 76, a second double parallelogram linkage is formed by two longer links 83 and 84 pivotally connected at 85 and two shorter links 86 and 87 pivoted to the longer links at 88 and 89, the two pivots 80 and 81 also connecting the links 83 and 86 to the intermediate floating base link 76 which separates the lower and upper double parallelograms of the linkage.

The tops of the two links 84 and 87 are pivotally attached at 90 and 91 to an upper moving base link 90' on which the drive motor 92 of saw 43 is fixedly mounted. A powered or idler gear 93 on the link 90' engages the teeth 64 of plate 63. At least one of the gears 93 or 77 is powered by conventional means, not shown.

Figure 3:
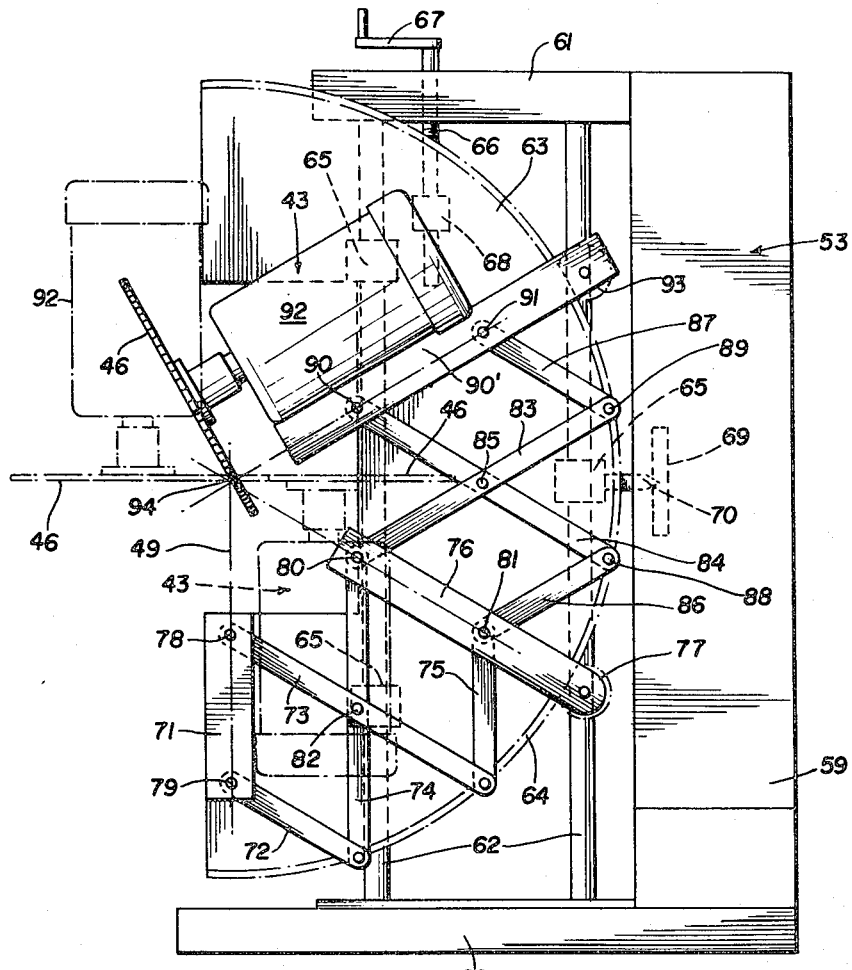
FIG. 3 is an enlarged front elevation of an individual saw supporting, adjusting and rotational movement means.
Figure 4:
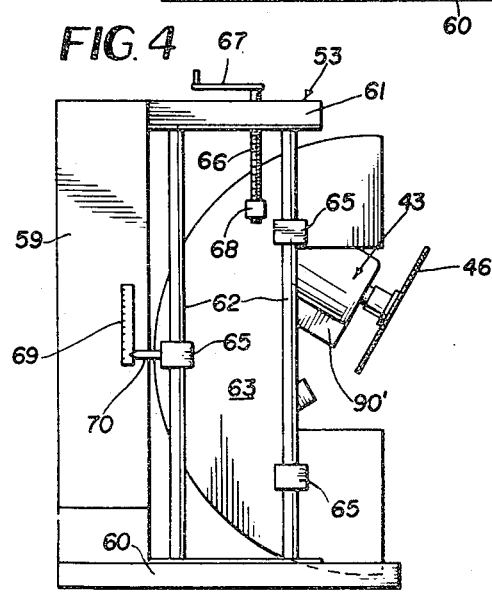
FIG. 4 is a rear elevation, on a reduced scale, of the elements shown in FIG. 2 and showing particularly the independent vertical adjusting means for each saw with the saw positioned at a low elevation.
Figure 5:
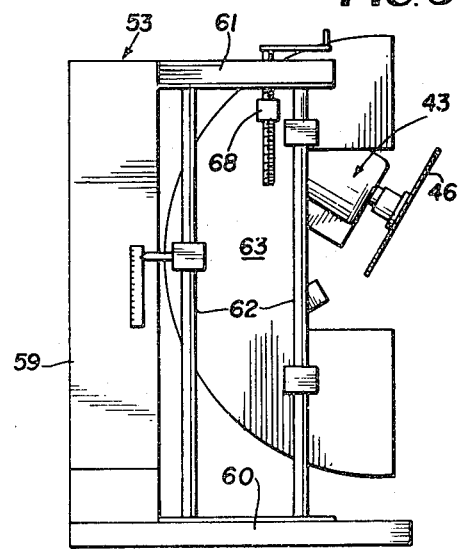
FIG. 5 is a similar view of the vertical adjusting means with the saw positioned at a high elevation.

The described linkage in FIG. 3 enables the saw 43 to pivot or rotate through a full 180 degrees between the two phantom line positions shown where the blade 46 is horizontal and can face downwardly or upwardly in relation to drive motor 92. One intermediate angled position of the saw 43 is shown in full lines in FIGS. 3 to 5, and the saw can be infinitely adjusted to any angled position between the two extremes shown in phantom lines. It can be noted in FIG. 3 that center lines drawn through the pivots 90 and 91 on link 90', through the pivots 80 and 81 on link 76, and through the pivots 78 and 79 will intersect at a point 94 on the outer face of circular saw blade 46 and on the described vertical datum plane 49 which lies on the center line through pivots 78 and 79. At all points along the saw blades angular adjustment path on the semi-circular plate 63, a chord on the saw blade 46 through the point 94 forms the pivot or rotational axis for that particular saw in the common vertical datum plane 49. Such chord on the saw blade 46 defining its rotational axis in the datum plane 49 is shown at 94a in FIG. 6. The corresponding chords for saw blades 47 and 48 are indicated at 94b and 94c in FIG. 6, the respective saws 44 and 45 in FIG. 6 being adjusted to vertical positions different from the position of the saw 43, by the means described particularly in FIGS. 4 and 5. It is to be understood that each of the chords 94a, 94b and 94c, regardless of the vertical adjustment of each saw in the three saw gang always lies in the vertical datum plane 49. Furthermore, in all rotated positions of the saw 43 or any saw in its gang, the saw blade always rotates or pivots about the intersection point 94 which defines the chord across the saw blade.

A great advantage derived from this geometry is that the cutting ability of each saw blade is not restricted as in the prior art to one peripheral segment of the blade. Because the blade can rotate through a full 180 degrees around the point 94, two diametrically opposite portions or segments of each blade can be used for cutting wood members at positive or negative angles as they are fed through the saws by conveying means, already mentioned.

It must also be understood regarding the geometry of the saw movement means that the pitch circle of the teeth 46 on plate 63 is centered on the point 94 which is in the datum plane 49. The combination of the vertical adjustment for each saw through the mechanism shown in FIGS. 4 and 5 and the rotational adjustment through the means shown in FIG. 3 greatly expands the mobility of each saw compared to the prior art where all of the saws were at a common fixed vertical height and could only rotate or pivot through 90 degrees at that height. The versatility of the apparatus in terms of making a greater number of angular cuts on wooden members at a greater variety of angles is greatly expanded in this invention.

The above-described relationships of saw blades 46, 47 and 48 and their chords 94a, 94b and 94c within the vertical datum plane 49 is exactly repeated with the saw blades 36, 37 and 38 of the gang of saws 33, 34 and 35 on the base frame 30. That is to say, the blades 36, 37 and 38 have chords 95a, 95b and 95c all lying within the vertical datum plane 39 and about which chords the several saws 33, 34 and 35 independently rotate under influence of their double pantograph type linkages described in detail for the one saw 43.

A horizontal datum or reference plane 96 important in the setting up and precision operation of the apparatus can be established with taut chords or the like to be exactly at right angles to the vertical datum planes 39 and 49 and across the tops of lower primary conveyor sections 41 and 57, FIG. 1. The horizontal datum plane 96 is the plane that will define the bottom faces of wood members passing through the machine from front to back and it is in relation to this plane 96 that the several saws in the two gangs are independently vertically adjusted to provide the desired sequence of cuts in conjunction with the angular adjustment of each saw through its rotational linkage described relative to FIG. 3. Thus, the apparatus has more precise geometry than any prior art apparatus as a result of the establishment of the vertical and horizontal datum planes with precision.

The improved wood member conveyor system dispensing with the need in the prior art for a troublesome long torque shaft is shown primarily in FIG. 8. In this figure, the two primary conveyors 40 and 56, previously mentioned, composed of lower and upper sections 41 and 42 and 57 and 58 are illustrated. Two auxiliary removable lower conveyor sections 97 and 98 used with longer wood members to provide intermediate support in the apparatus are also shown in FIG. 8. These auxiliary conveyor sections are removed from the system when short wood members are being processed. In connection with FIG. 8, conveyor 40 having sections 41 and 42 and auxiliary section 97 are fixed on base frame 31, whereas conveyor 56 with its sections 57 and 58 and auxiliary section 98 are mounted on and move with carriage 32. In FIG. 8, carriage 32 has a propulsion shaft 99, not shown elsewhere, having gears 100 thereon which roll on guiding and supporting rack bars 101 suitably secured to base frame 30.

The carriage and the entire conveyor system for the apparatus is powered by a motor 102 on the base frame 30 having a right angle gear drive 103 turning a transverse shaft 104 on the base frame 30 equipped at one end with an electromagnetic clutch 105 which can selectively be rendered active or inactive at a push button control panel 106 on the base frame 30, FIG. 1. The driven shaft 104 carries sprocket gears 107 and 108 engaging parallel longitudinal endless sprocket chains 109 and 110 which, at their far ends, engage idler sprockets 111 and 112 also on base frame 30. Chain 109 has a driving connection through a sprocket gear 113 with an electromagnetic clutch 114 on carriage displacement shaft 99 which in turn has another sprocket gear 115 thereon engaged with the chain 110. The clutch 114, like all of the electromagnetic clutches in the system, is under control of an operator at the control panel or station 106. The electromagnetic clutches are conventional devices which also have braking capability.

Through the sprocket 107, the chain 109 is positively driven and this chain includes a loop 116 engaging a sprocket gear 117 on an electromagnetic clutch brake 118 connected through a right angle gear drive 119 with another sprocket gear 120. This sprocket gear engages and drives an ascending endless sprocket chain 121 engaging and driving a sprocket gear 122 having a square opening to receive and drive in one direction a square shaft 123 having a telescoping section 124 whose length may be varied between universal joints 125 and 126 in the square shaft. A sprocket gear 127 beyond the universal joint 126 on this square shaft engages and drives the overhead section 42 of primary conveyor 40 above the lower section 41 which has equidistantly spaced lugs 128 thereon to assure that the wood members are positively driven through the saw gangs from front to back of the machine.

Another square shaft 129 below the shaft 123 carries a sprocket gear 130 engaging the outside of chain 121 to drive shaft 129 oppositely to shaft 123, thereby driving the top run of lower conveyor section 41 in the same linear direction as the bottom run of upper section 42. Lower section 41 is driven by a sprocket gear 131 on square shaft 129. Auxiliary removable conveyor section 97 is coupled with and driven by square shaft 129 through a smaller square shaft 132 which telescopes into shaft 129 removably. Shaft 132 carries a sprocket gear 133 to power auxiliary conveyor section 97 which is at the same elevation as lower primary conveyor section 41. The tops of conveyor sections 41 and 97 coincide with the horizontal datum plane 96, as best shown in FIG. 1.

An identical and independent drive system for the carriage mounted conveyor 56 including lower and upper sections 57 and 58 and auxiliary removable lower section 98 is provided. This independent drive system is also controlled from the control panel 106 whereby the carriage mounted and base frame mounted conveyors can be powered in unison, or one can be powered independent of the other. The drive for the carriage mounted conveyor means thus comprises another loop 134 in drive chain 109 operatively connected with another electrical clutch brake unit 135, connected through a right angle gear drive 136 with an ascending chain 137 driving a square shaft 138 for powering the upper section 58 of primary conveyor 56 in the same direction as the upper section 42 of primary conveyor 40. The lower conveyor section 57 and auxiliary section 98 are powered through another square shaft 139 driven off of chain 137 and a removable telescoping square shaft 140 corresponding to shaft 132.

It can now be readily understood that the improved conveyor system without a long torque shaft is not only more adapted to processing long wood members but is more precise and much more versatile. For example, with the drive motor 102 energized and the clutches 105 and 114 activated, the carriage 32 with its gang of saws 43, 44 and 45, their supports and the conveyor 56 can be displaced toward or away from the stationary platform 31 and the gang of saws and conveyor means thereon. By deactivating clutches 105 and 114 and activating clutches 118 and 135, the two primary conveyors 40 and 56, with or without their auxiliary sections 97 and 98, can be driven in unison. By disabling one of the clutches 118 or 135, one primary conveyor 40 or 56 can be halted while the other is advanced to accomplish an askewed advancement of a wood member 141 or members through the saws for the purpose of making compound angle end cuts thereon as distinguished from advancing a member or members 142 through the apparatus at right angles to the parallel conveyors 40 and 56, see FIG. 9. The versatility of the system and its lack of dependence on any long torque shaft has been demonstrated.

The combination of carriage positioning by displacement of the shaft 99 and the independent vertical adjustments of the several saws plus their pivotal or rotational independent adjustments enables the apparatus to produce with great precision on a mass production basis a great variety of long and short wooden components. For example, FIG. 16 shows a roof truss having members 143 and 144 which are shown separately on an enlarged scale in FIGS. 18 and 19. Either of these members may be cut to length and may have all of the necessary angle cuts formed on their opposite ends in a single pass through the apparatus. Likewise, the other members 145 and 146 of the truss, FIG. 16, can be mass produced by the apparatus as can a wide variety of other members with proper adjustment of the carriage 32 and coordinated adjustments of the saws in the two cooperating gangs. Whenever required, one or more saws in each gang of three saws can be swung to a position where the saw blade is horizontal and then adjusted vertically to remove the saw from action.

FIG. 17 shows a floor truss or the like whose web members 147 also shown in FIG. 20 can be produced in a single pass through the apparatus with the auxiliary conveyors 97 and 98 for long wood members removed.

FIG. 21 shows a surveyor's stake 148 which can be manufactured by the apparatus in a single pass, and FIG. 22 shows another member 149 having compound angle end faces 150 which can be produced on an askewed member as shown at 141 in FIG. 9.

A final important feature of the invention shown in FIG. 1 and in FIGS. 10 through 15 is a precision wood member measuring attachment or assembly 151 on the front of the base frame 30. This measuring assembly comprises a horizontal elongated shaft 152 having a plurality of collars 153 thereon at equidistantly spaced points along the shaft, such as one foot intervals. The shaft 152 is rotatably supported in bearings 154 and 155, the bearing 154 being attached to base frame 30 and the bearings 155 being attached to a rectangular measuring frame 156, in turn anchored to the base frame 30 through a bracket 157. Additional support bearings, not shown, can be provided at intervals along the shaft 152.

Each collar 153 on the shaft 152 carries a radial pin 158, only a few of such pins being shown in FIG. 10 for simplicity. The radial pins of successive collars 153 along the shaft 152 are spaced equidistantly circumferentially and progressively from each other so that only one pin lies in one radial plane through the shaft 152 and no other pin is in the same radial plane.

A carriage limit switch 159 on the carriage 32 has a depending switch actuator 160. The shaft 152 can be rotationally adjusted in its bearing to place one, and only one, pin 158 in the upright position shown in FIG. 12 in the path of movement of the carriage limit switch actuator 160 to engage such actuator and stop the movement of the carriage 32 at a particular point corresponding to the desired length of the wood member being cut by the two gangs of adjustable saws.

To facilitate adjusting the shaft 152 precisely circumferentially, a disc 161 on the shaft has circumferentially equidistantly spaced apertures 162 therein corresponding to the equidistant spacing of the carriage stop pins 158 around the shaft 152. The shaft and disc 161 can be rotated relative to a reference indicator 163 on a fixed plate 164 attached to frame 156, and when a particular pin 158 establishing the desired wood member length and carriage 32 stop point is upright, a locking pin 165 on indicator 163 is inserted into the adjacent aperture 162 of disc 161 corresponding to the particular required upright pin 158. That particular pin 158, and only that pin, will trip the actuator 160 and stop the carriage 32 at a given point to establish a precise spacing between the saws in the two gangs to thereby cut the wood member to a precise length.

In cases where the required length is not an even number of feet corresponding to the spacing between the collars 153, a fine distance adjustment scale 166 on the top of frame 156 is utilized. A scribe mark 167 on the plate 164 coacts with the scale 166 to reflect a precise measurement. An adjusting crank 168 at one end of the measuring attachment drives a screw shaft 169 having threaded engagement with the plate 164 to drive it in either direction along the measuring scale 166 to provide the refined measurement for the length of the wood member, whatever that length may be. The measuring device is simple, convenient to use and precise. It is much more reliable and consistent than a mere steel measuring rule or other makeshift means. Also, the device is automatic in stopping the carriage 32 carrying one of the saw gangs at precisely the desired point on the base frame 30.

The measuring device also possesses a safety feature in the form of two stop discs 170 on the shaft 152 near its opposite ends in the path of travel of limit switch actuator 160 at all times and in all rotational positions of shaft 152. These two stop discs prevent any possible over-travel of carriage 32 in either direction.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A wood member cutting apparatus comprising a base, a movable carriage on the base, saw gangs and wood member conveyors cooperatively mounted on the base and carriage, an integrated power drive means for the carriage and for said conveyors on the base, and a precision wood member length measuring and automatic carriage stop mechanism on the base, said mechanism comprising a rotational shaft extending longitudinally of the base, means to adjust the shaft axially along the base to a precision position, a plurality of axially equidistantly spaced and circumferentially equidistantly spaced radial stop pins on the shaft, and circumferential lockable locator means for the shaft enabling one radial stop pin at a time to be positioned on the shaft in the path of movement with the actuator element of a limit switch on the movable carriage to automatically stop the carriage at a position on the base corresponding to a required length measurement of a wood member being cut by said apparatus.

2. A wood member cutting apparatus as defined in claim 1, and said circumferential lockable locator means being on said means to adjust the shaft axially.

3. A wood member cutting apparatus as defined in claim 2, and said means to adjust the shaft axially comprising a manual screw-threaded linear distance indicator means along the axis of said shaft.

* * * * *